United States Patent [19]

Itoh

[11] 3,789,366

[45] Jan. 29, 1974

[54] RANDOM-ACCESS MEMORY DEVICE USING SEQUENTIAL-ACCESS MEMORIES

[75] Inventor: Takayuki Itoh, Kawasaki, Japan

[73] Assignee: Takachiho Koeki Kabushiki Kaisha, Osaka-shi, Japan

[22] Filed: Aug. 15, 1972

[21] Appl. No.: 280,798

Related U.S. Application Data

[63] Continuation-in-part of Ser. No. 26,881, April 9, 1970, abandoned.

[30] Foreign Application Priority Data

Apr. 18, 1969 Japan ................................ 44/29647

[52] U.S. Cl. ............................................ 340/172.5

[51] Int. Cl. ......................... G06f 3/14, G11c 21/02

[58] Field of Search ... 340/172.5, 173 RC, 174.1 H, 340/174.1 P

[56] References Cited

UNITED STATES PATENTS

| | | | |
|---|---|---|---|
| 3,387,281 | 6/1968 | Peters | 340/172.5 |
| 3,623,005 | 11/1971 | Roberts, Jr. | 340/172.5 |
| 3,013,254 | 12/1961 | Walker | 340/174.1 H |
| 3,024,993 | 3/1962 | Wright et al. | 340/172.5 X |
| 3,587,062 | 6/1971 | Dixson Teh-Chao Jen | 340/172.5 X |
| 3,711,836 | 1/1973 | Dirks | 340/172.5 |

*Primary Examiner*—Paul J. Henon
*Assistant Examiner*—Melvin B. Chapnick
*Attorney, Agent, or Firm*—Robert E. Burns; Emmanuel J. Lobato

[57] ABSTRACT

A random-access memory device using at least one circulating main memory having a plurality of memory zones allocated sequentially, and a plurality of circulating buffer memories each having a memory capacity equal to one-*h* th the memory capacity of the circulating main memory and each circulating in the same clock timing as the circulating main memory, the "h" being an integer more than two. Blocks of binary information stored in the main memory are successively read out to selected ones of the buffer memories by selecting corresponding ones of the memory zones in response to zone selecting coded signals. The number of buffer memories is equal to twice the number of all memory zones of the circulating main memory. The buffer memories are divided into two groups of the same number. The contents of the circulating main memory or memories can be continuously read out by selecting one of the two groups and selecting the buffer memories of the selected group in the desired order.

3 Claims, 12 Drawing Figures

RANDOM-ACCESS MEMORY DEVICE USING SEQUENTIAL-ACCESS MEMORIES

CROSS REFERENCES TO RELATED APPLICATIONS

This application is a continuation-in-part of my co-pending application, Ser. No. 26, 881, filed on Apr. 9, 1970, and now abandoned.

FIELD OF THE INVENTION

This invention relates to a memory device using a sequential-acess memory device.

DESCRIPTION OF THE PRIOR ART

In sequential-access memory devices, such as a magnetic drum and a magnetic disc etc., random-access storages of high price (e.g.; core memory) are usually used as buffer memories to synchronize the block timing of the sequential-access memory device with the clock timing of an external circuitry (e.g.; a logical operation unit). Therefore, the bit-cost of conventional sequential-access memory devices is relatively high.

SUMMARY OF THE INVENTION

An object of this invention is to provide a memory device using a sequential-access memory device of low cost capable of readily synchronizing with the clock timing of an external circuitry by the use of sequential-access buffer memory devices only.

Another object of this invention is to provide a random-access memory device using sequential-access memories capable of continuously reading out the contents of at least one sequential-access memory in the desired order in a block-wise manner.

To attain the objects of this invention, the random access memory device of this invention is provided with at least one circulating main memory having a memory capacity of G.$h$ bits where G is a larger number and $h$ is an integer greater than two and a plurality of circulating buffer memories each having a memory capacity of G bits and each circulating in the same clock timing as the main memory. A block of binary information of G bits stored in the main memory is read out to one of the buffer memories by selecting one of memory zones which are allocated sequentially in the main memory so as to divide a circulating period of the main memory into one-$h$ th. If a plurality of main memories are employed, selection of a desired one of the main memories is further necessary. In both cases, a desired number of blocks of binary information stored in one or more of the main memories can be read out in the desired order by selecting the buffer memories in a predetermined order.

If the plurality of buffer memories, the number of which is equal to twice the number of all memory zones of one of the main memories are provided, and if the contents of desired memory zones of the main memory or memories are read out alternately to two equally divided groups of the buffer memories, the contents of the main memory or memories can be continuously read out by selecting alternately the two groups and further by selecting successively the buffer memories in the same group.

The memory device of this invention is suitable to select continuously a train of desired blocks of information from a great number of blocks of information to be selected, such as ideograms (e.g.; Chinese characters).

Accordingly, a printer for the Chinese characters can be readily realized by the use of the memory device of this invention.

The principle, construction and operation of the sequential-access memory device of this invention will be better understood from the following more detailed discussion in conjunction with the accompanying drawings, in which the same or equivalent parts are designated by the same reference numerals, characters and symbols.

DESCRIPTION OF THE PREFERRED EMBODIMENTS

Figure 1A:
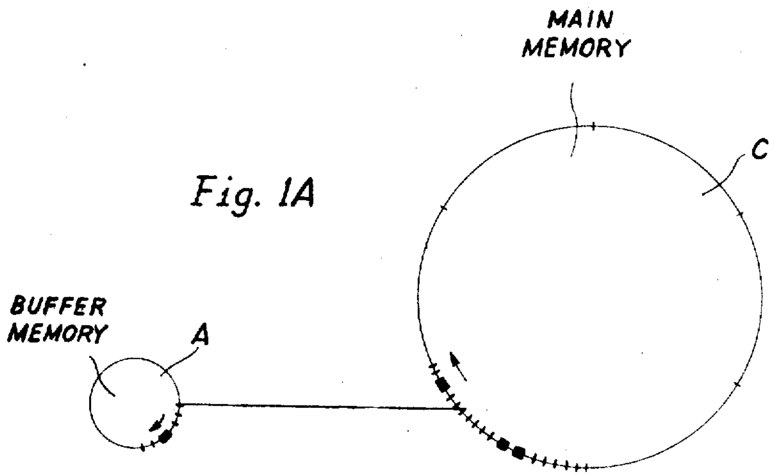
FIGS. 1A and 1B are diagrams explanatory of the construction and operation of a combination formed by a main memory and a buffer memory used in the memory device of this invention.
Figure 1B:
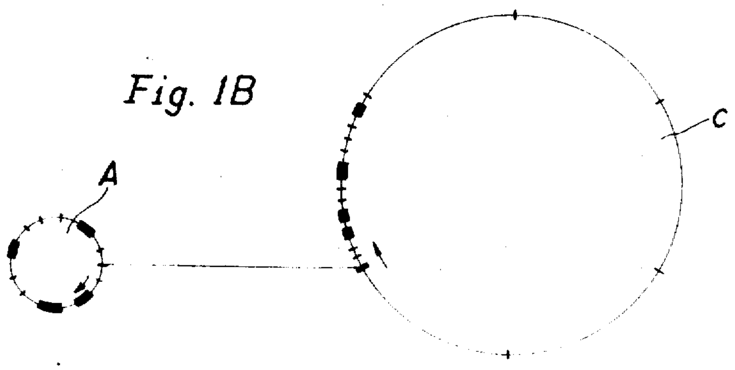

In a memory device of this invention, at least one circulating main memory C and a plurality of circulating buffer memories A are used. The main memory C has a plurality of memory zones (e.g.; six memory zones as shown in FIGS. 1A and 1B) each having a memory capacity $G^h$ bits where for example G is 1024 and $h$ is 10 and allocated sequentially in the main memory C so as to divide a circulating period of the main memory C into one-$h$ th. The buffer memory A has a memory capacity of G bits and circulates in the same clock timing as the clock timing of the main memory C. Therefore, the memory capacity of the buffer memory A is equal to the memory capacity of each memory zone of the main memory C. FIG. 1A shows a condition where a part of the contents stored in one of the memory zones of the main memory C is read out to the buffer memory A, while FIG. 1B shows a condition where contents stored in one of the memory zones of the main memory C have been completely read out to the buffer memory A. Each of the above mentioned circulating memories A and C can be constructed by the use of a magnetostrictive delay-line by way of example, as disclosed in a publication "Convention on Digital-Computer Techniques", Mar. 1956, pages 497 – 508.

Figure 2:
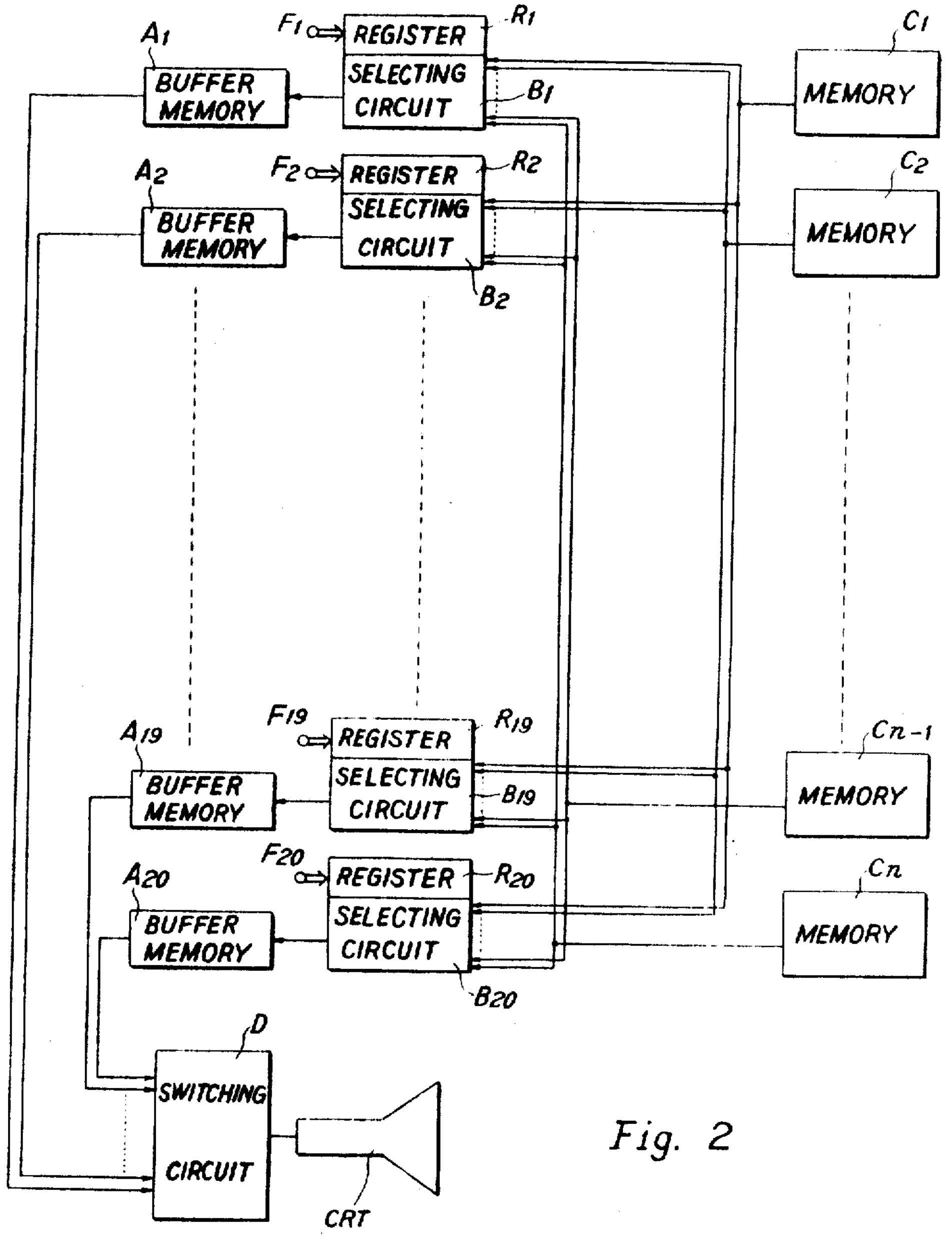
FIG. 2 is a block diagram illustrating an embodiment of this invention.

With reference to FIG. 2, the principle of this invention applied to a display system using a cathode ray tube will be described. This embodiment comprises a plurality of $n$ main memories $C_1$ to $C_n$, twenty buffer memories $A_1$ to $A_{20}$, terminals $F_1$ to $F_{20}$ for receiving respectively zone-selecting coded signals, registers $R_1$ to $R_{20}$ for respectively storing temporarily the zone-selecting coded signals (e.g.; six or twelve-unit code), selecting circuits $B_1$ to $B_{20}$ each comprising a plurality of AND circuits by way of example for selecting one of the main memories $C_1$ to $C_n$ and one of the memory zones of the selected main memory $C_1$, $C_2$, or $C_n$ in response to the zone-selecting coded signal stored in the corresponding one of the register $R_1$ to $R_{20}$, a switching circuit D comprising a plurality of AND circuits by way of example for selecting contents of the buffer memories $A_1$ to $A_{20}$ in the desired order, and a cathode ray tube CRT coupled to the switching circuit D to display the read-out contents of the buffer memories $A_1$ to $A_{20}$.

In each of the memory zones of the main memory $C_1$, $C_2$ . . . or $C_n$, a character of font information (i.e.; pattern information indicative of each one of a set of types) obtained by scanning the pattern of a corresponding type so as to display on the cathode ray tube CRT is stored. If the main memory $C_1$, $C_2$, . . . or $C_n$ has ten memory zones by way of example, each of the main memories $C_1$ to $C_n$ stores ten characters of font information. On the other hand, since the buffer memory $A_1$, $A_2$, . . . or $A_{20}$ has the memory capacity equal to one-$h$ th the memory capacity of the main memory $C_1$, $C_2$, . . . or $C_n$, a character of font information is stored in each of the buffer memories $A_1$ to $A_{20}$ in a case where ten characters of font information are respectively stored in the ten memory zones of each of the main memories $C_1$ to $C_n$.

In operation, if one of the zone selecting coded signals is applied to the terminal $F_1$, this zone selecting coded signal is temporarily stored in the register $R_1$. The selecting circuit $B_1$ selects one of the main memories $C_1$ to $C_n$ and one of ten memory zones of the main memory $C_1$, $C_2$, . . . or $C_n$ is selected. The contents of the selected memory zone (i.e.; a character of font information) are read out to the buffer memory $A_1$ as shown in FIGS. 1A and 1B. Each group of circuitry ($A_2$, $F_2$, $R_2$, $B_2$), . . . ($A_{19}$, $F_{19}$, $R_{19}$ $B_{19}$) or ($A_{20}$, $F_{20}$, $R_{20}$, $B_{20}$) operates in a similar manner as mentioned above.

As understood from the above conditions, 10 characters of font information are stored in one of two groups of 10 buffer memories ($A_1$ to $A_{10}$) and ($A_{11}$ to $A_{20}$) in one circulating period of the main memory $C_1$, $C_2$, . . . or $C_n$. In other words, desired twenty characters of font information can be read out to the buffer memories $A_1$ to $A_{20}$ in two circulating periods of the main memory $C_1$, $C_2$, . . . or $C_n$. Accordingly, if the switching circuit D reads out alternately the contents of the two groups of buffer memories ($A_1$ to $A_{10}$) and ($A_{11}$ to $A_{20}$) in synchronism with the circulating periods of the main memories $C_1$ to $C_n$ while the contents of the buffer memories ($A_1$ to $A_{10}$) or ($A_{11}$ to $A_{20}$) of the same group are successively read out in one circulating period of the main memory ($C_1$, . . . $C_n$), characterpatterns each indicative of a single type can be displayed on the cathode ray tube CRT.

Figure 3:
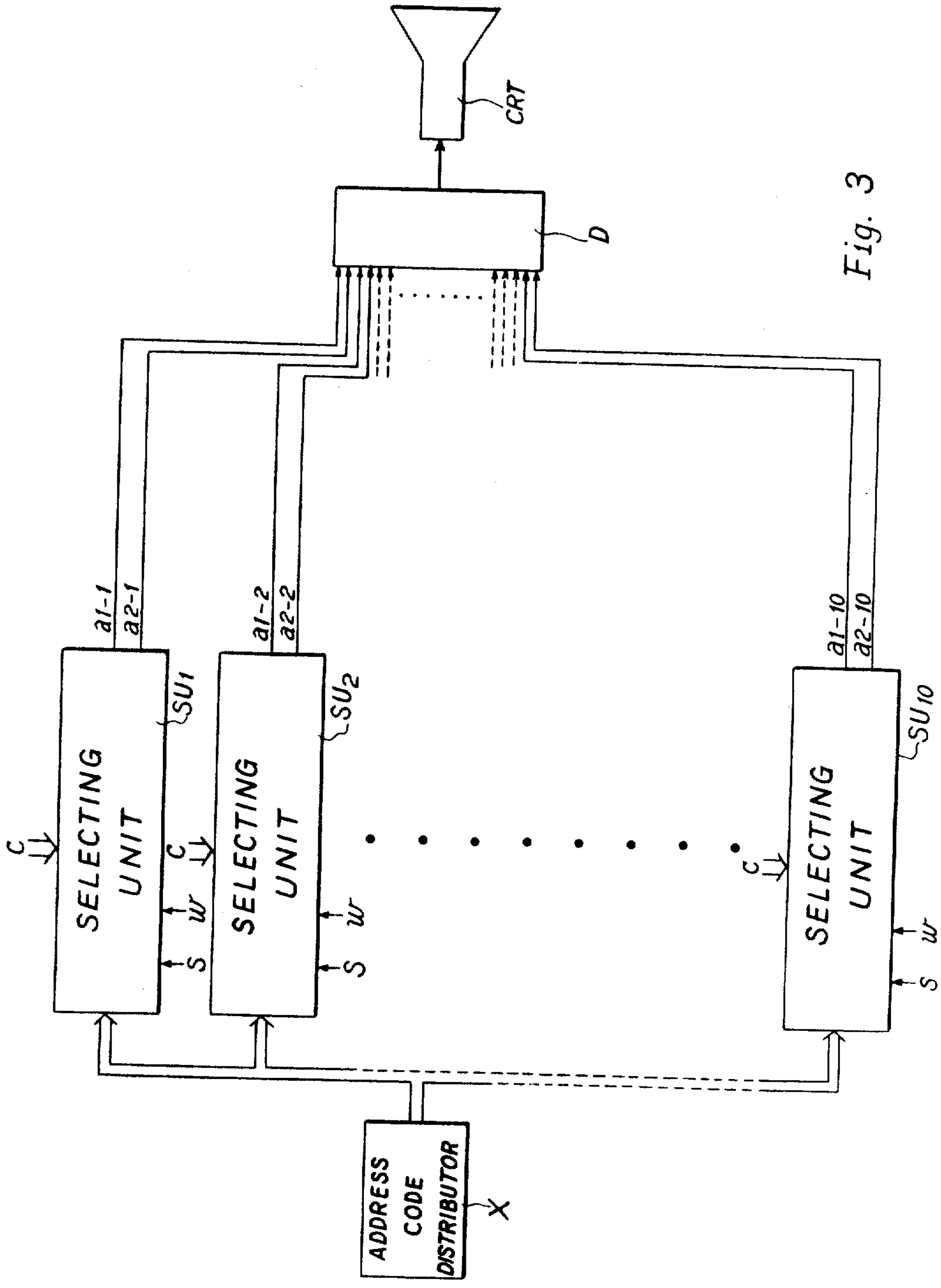
FIG. 3 is a block diagram illustrating another embodiment of this invention.
Figure 4:
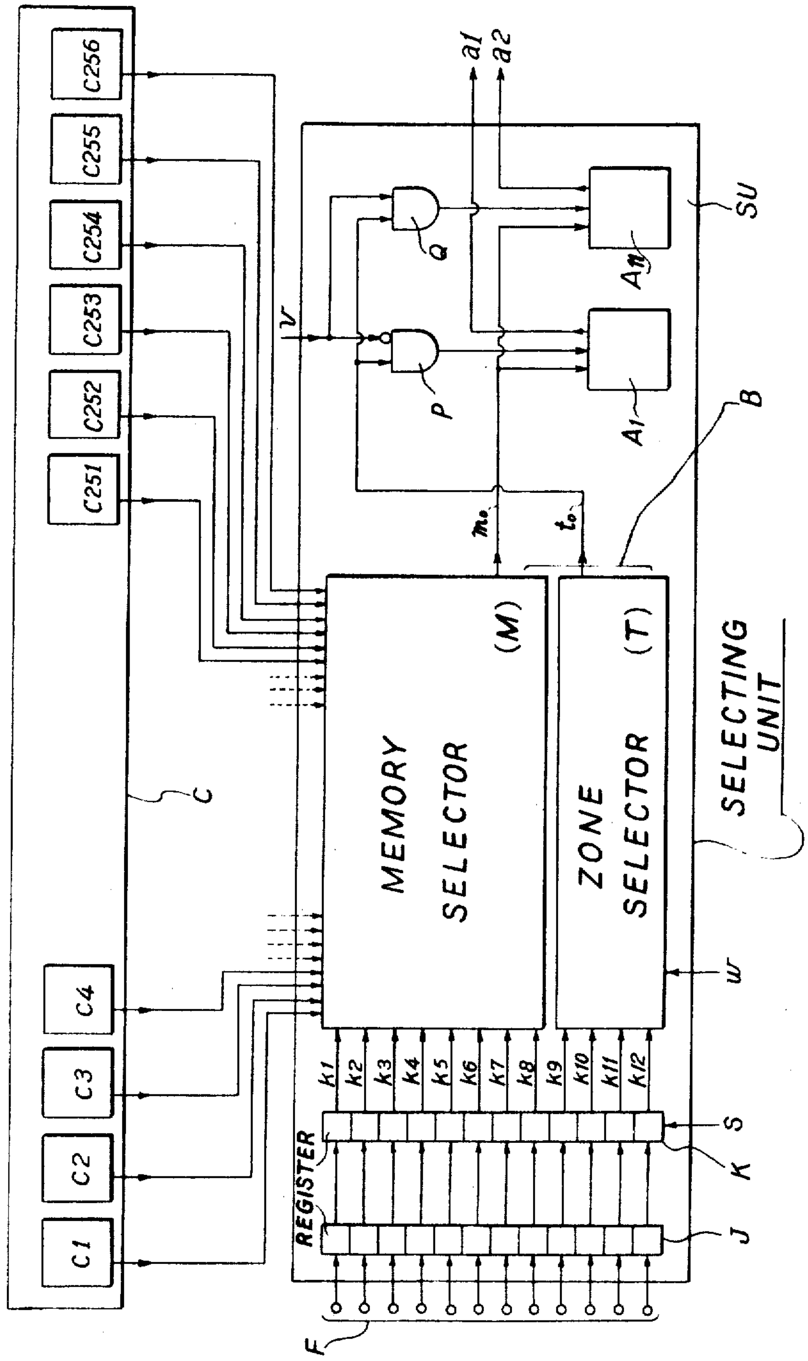
FIG. 4 is a block diagram explanatory of an example of a selecting unit used in the memory device of this invention.

With reference to FIGS. 3 and 4, another embodiment of this invention will be described. In this embodiment, ten selecting units $SU_1$, $SU_2$, . . . and $SU_{10}$ are provided as shown in FIG. 3 to read out contents of the main memories C so as to apply the same to the switching circuit D. In this case, each of the selecting units $SU_1$, $SU_2$, . . . $SU_{10}$ is provided with two buffer memories (e.g.; $A_1$ and $A_{11}$) which are controlled by single selecting means as mentioned below.

In this embodiment, two hundred and 56 main memories $C_1$, $C_2$, $C_3$, $C_4$, . . . $C_{251}$, $C_{252}$, $C_{253}$, $C_{254}$, $C_{255}$ and $C_{256}$ are provided by way of example as shown in FIG. 4. For selecting contents of the group of main memories, ten selecting units $SU_1$, $SU_2$, . . . $SU_{10}$ are provided.

Each of the selecting units $SU_1$, $SU_2$, . . . . $SU_{10}$ comprises a group of twelve terminals F, registers J and K, a memory selector M comprising a plurality of AND circuits by way of example, a zone selector T comprising a plurality of AND circuits by way of example, an AND circuit Q, and a NAND circuit P, and buffer memories ($A_1$ and $A_{11}$). The group of twelve terminals F receive the zone selecting coded signal of twelve unit code from an address code distributor X (FIG. 3) 3) in the parallel signal configuration. The register J stores temporarily the zone selecting coded signal of parallel configuration applied from the twelve terminals F during one circulating period of the main memory C. The register K stores temporarily the zone selecting coded signal shifted from the register J in response to a shift pulse s generated from a clock generator (not shown) so as to be timed with the transition instant from the preceding one to the succeeding one of adjacent two circulating periods of the main memory C. The memory selector M selects one of the main memories $C_1$ to $C_{256}$ in accordance with a part of the zone selecting coded signal applied through connection lines $k_1$ to $k_8$. Therefore, one of the main memories $C_1$ to $C_{256}$ is connected to both the buffer memories $A_1$ and $A_{11}$. The zone selector T generates a gate signal $m_o$ timed with the time slot of a desired memory zone of the selected main memory $C_1$, $C_2$, . . . or $C_{256}$ in accordance with a part of the zone selecting coded signal applied through connection lines $k_9$ to $k_{12}$ when the zone selecting coded signal from the connection lines $k_9$ to $k_{12}$ coincides with a reference signal $w$ of four-unit parallel configuration. This reference signal $w$ is generated from a scale-of-10 counter (not shown), in synchronism with transition instants from the preceding one to the succeeding one of adjacent two memory zones, if each of the main memories $C_1$ to $C_{256}$ has ten memory zones. Tegate signal generated from the zone selector T is applied to respective one input terminals of both the circuits P and Q. To the other input terminals of the circuits P and Q, another gate signal $v$ is applied from a bistable circuit (not shown). This gate signal $v$ assumes one of two possible states ("1" and "0"; or "+" and "−") which are alternately switched in synchronism with the circulating periods of the main memory C. Accordingly, the output of the circuits P and Q are alternatively applied to the buffer memory $A_1$ or $A_{11}$ in synchronism with the gate signal to from the zone selector T so that the contents of the selected memory zone of the selected main memory $C_1$, $C_2$, . . . or $C_{256}$ are stored in the buffer memory $A_1$ or $A_{11}$. The respective outputs of the buffer memories $A_1$ and $A_{11}$ are applied to the switching circuit D through connection lines $a_1$ and $a_2$, respectively.

In operation, one of the zone selecting coded signals is shifted to the register K in synchronism with one of the circulating periods of the main memory C to select a desired memory zone of the main memory $C_1$, $C_2$, . . . $C_{256}$ at the instant circulating period, while another of the zone selecting coded signals is temporarily stored in the register J to select a desired memory zone of the main memory $C_1$, $C_2$, . . . or $C_{256}$ at the just succeeding circulating period. If the contents of a desired memory zone of the main main memory $C_1$, $C_2$, . . . or $C_{256}$ are read out to the buffer memory A, at one circulating period of the main memory C, the contents of a desired memory zone of the main memory $C_1$, $C_2$, . . . or $C_{256}$ are read out to the buffer memory $A_{11}$ at the immediately succeeding circulating period of the main memory C as understood from the above-mentioned construction of the selecting unit SU. If the switching circuit D selects successively connection lines $a_{1\text{-}1}$, $a_{1\text{-}2}$, . . . $a_{1\text{-}10}$, $a_{2\text{-}1}$, $a_{2\text{-}1}$, . . . and $a_{2\text{-}10}$, the contents of buffer memories $A_1$, . . . $A_{10}$, $A_{11}$, . . . $A_{20}$ can be applied continuously to the cathode ray tube CRT. In this case, if selection of connection lines $a_{1\text{-}1}$, $a_{1\text{-}2}$, . . . $a_{1\text{-}10}$ is timed with a circulating period of the main memory C, selection of connection lines $a_{2\text{-}1}$, $a_{2\text{-}2}$, . . . $a_{2\text{-}10}$ is timed with an immediately succeeding circulating period of the main memory.

Figure 5:
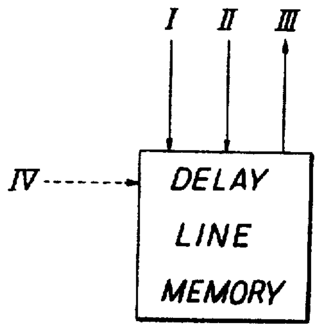
FIG. 5 is a block diagram explanatory of an example of a delay line memory used in the memory device of this invention.

In the above-mentioned embodiments, each of the main memories C and the buffer memories A is a circulating memory using a magnetostrictive delay line by way of example as shown in FIG. 5. In this case, this circulating memory has a first terminal I receiving an input serial information signal, a second terminal II receiving a gate signal having one of two possible states, a third terminal III sending out an output serial information signal and a fourth terminal IV receiving clock pulses used to control the write-in and read-out of the serial information signal.

Figure 6:
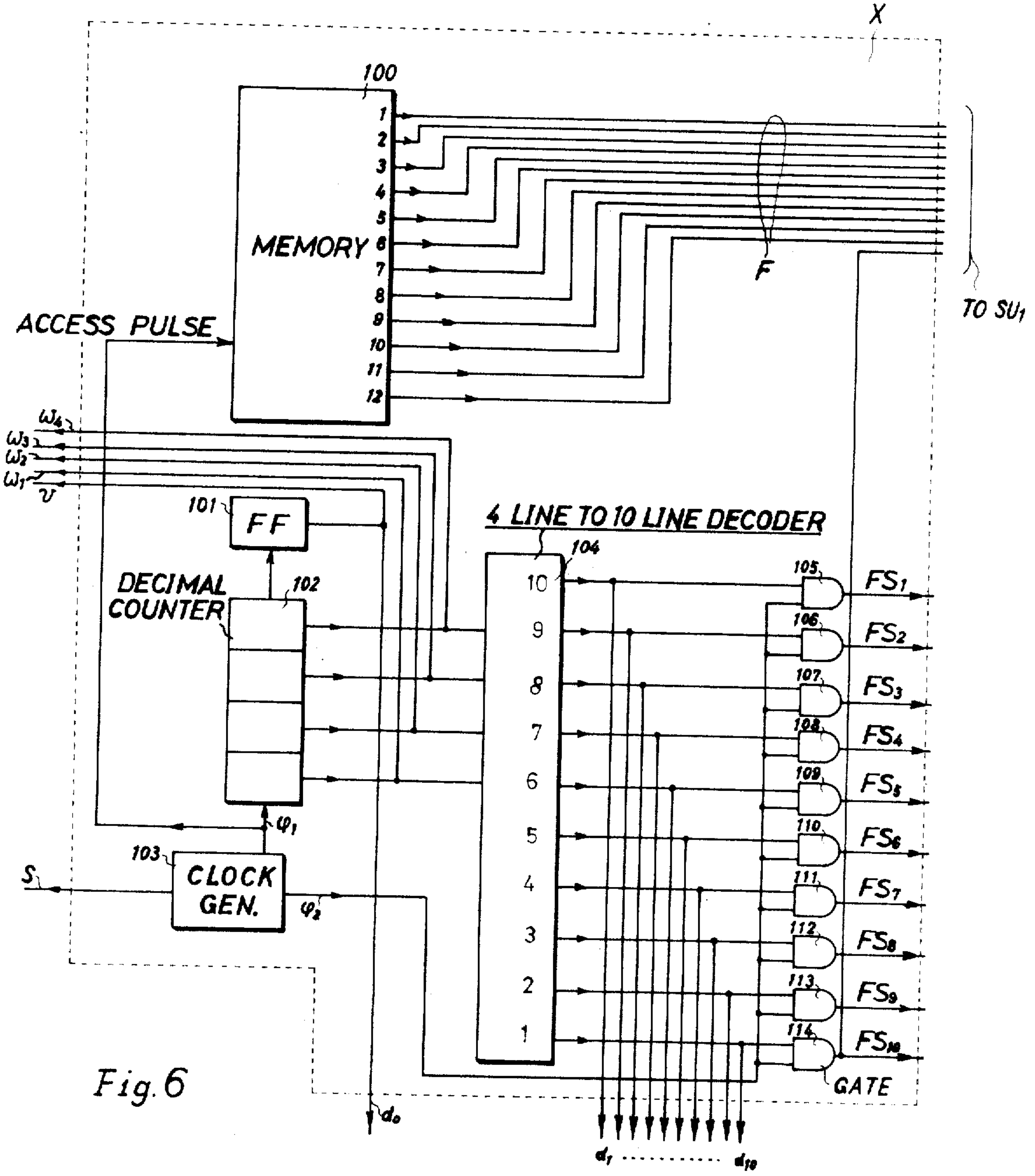
FIG. 6 is a block diagram illustrating an example of an address code distributor X employed in the device of this invention.
Figure 10:
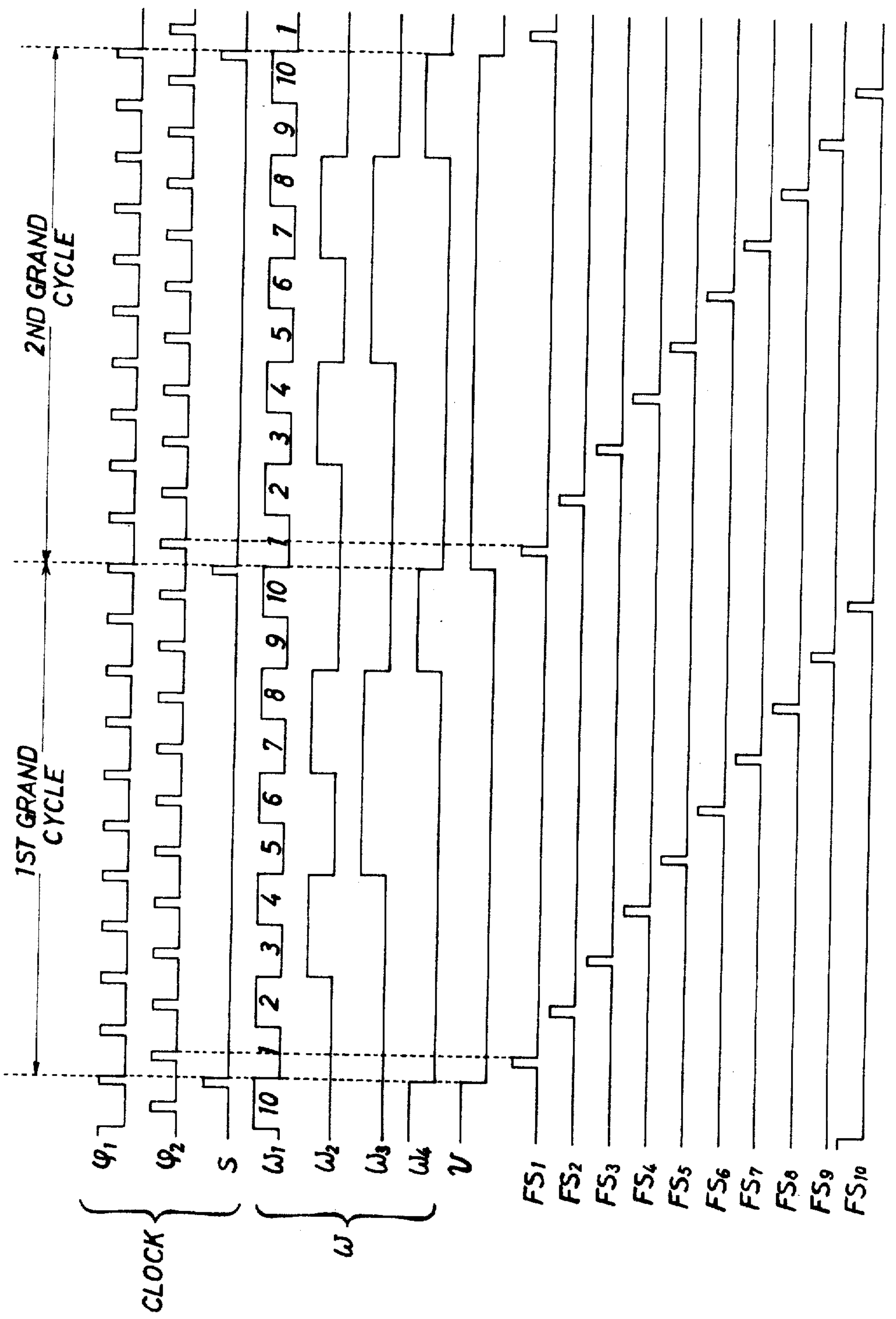
FIGS. 10 and 11 are time charts explanatory of operations of the device of this invention.
Figure 11:
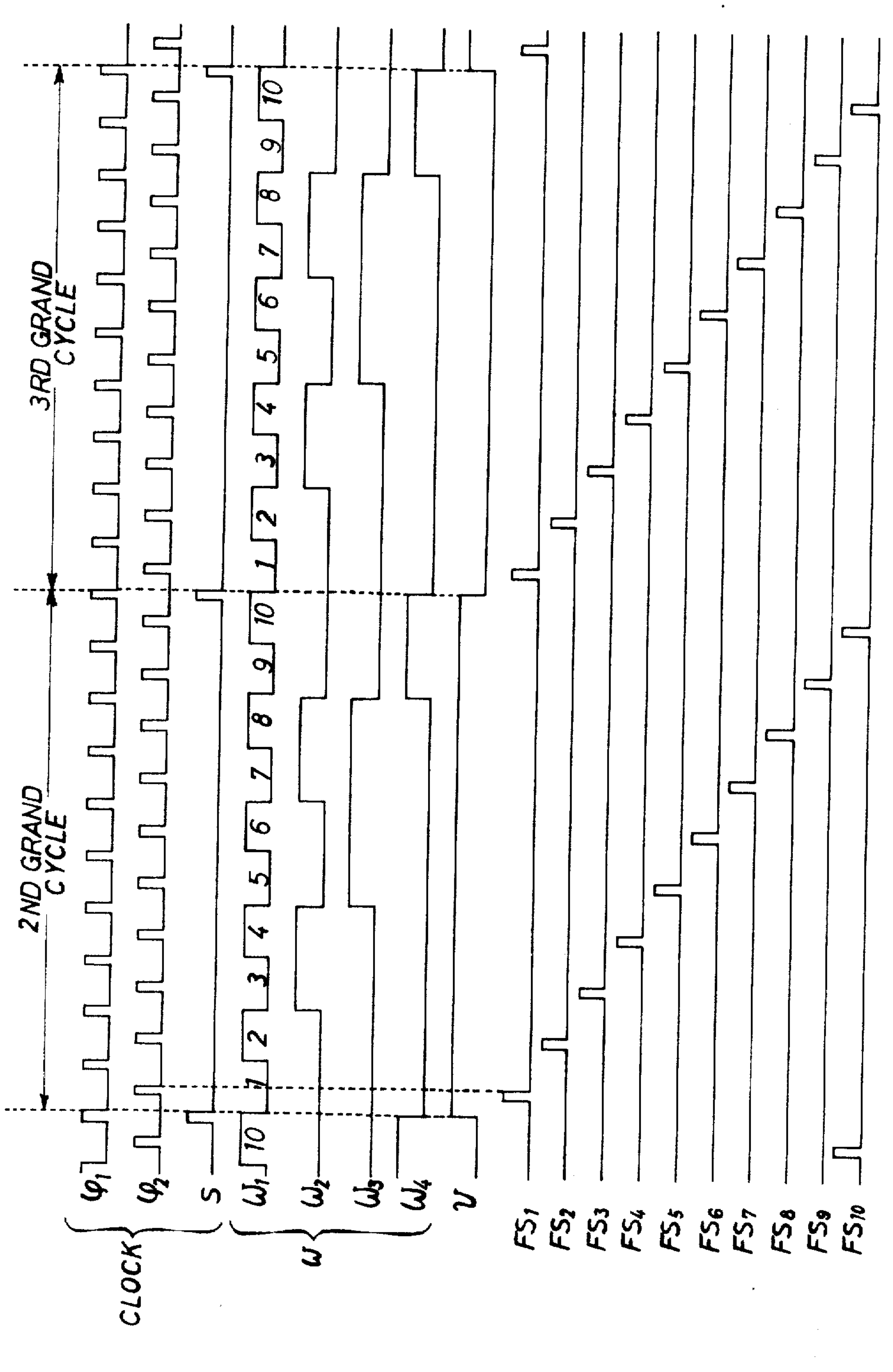

With reference to FIG. 6, the address code distributor X comprises, for example a clock generator 103, a decimal counter 102, a flip-flop circuit 101, a memory 100, a four line-to-ten line decoder 104, and ten AND circuits 105 to 114, by way of example. The clock generator 103 generates a clock pulse train $s$ timed with the grand cycle (circulating period) of the main memory C, and clock pulse trains $\phi_1$ and $\phi_2$ which are timed with one-tenth of the grand cycle of the main memory C as shown in FIGS. 10 and 11. The decimal counter 102 counts pulses of the pulse train $\phi_1$ and assumes successively counting states 0 to 9. The flip-flop circuit 101 is set and reset in response to carry pulses from the decimal counter 102 and produces an output $v$, which is the same as a control output $d_o$ . The memory 100 generates address codes F in response to access pulses of the pulse train $\phi_1$, so that the address codes F are applied to all the selecting units SU. The four line-to-ten line decoder 104 produces one of ten true outputs $d_1$ to $d_{10}$ in response to the instant states of four outputs $w_1$, $w_2$, $w_3$ and $w_4$ of the decimal counter 102. The true outputs $d_1$ to $d_{10}$ are respectively applied to AND circuits 105 to 114 which are gated by pulses of the pulse train $\phi_2$, so that control pulses $FS_1$, $FS_2$, . . . $FS_9$ and $FS_{10}$ are successively generated as shown in FIGS. 10 and 11. For example, the control pulse $FS_{10}$ is applied to the selecting unit $SU_1$ together with the address codes F.

Figure 7:
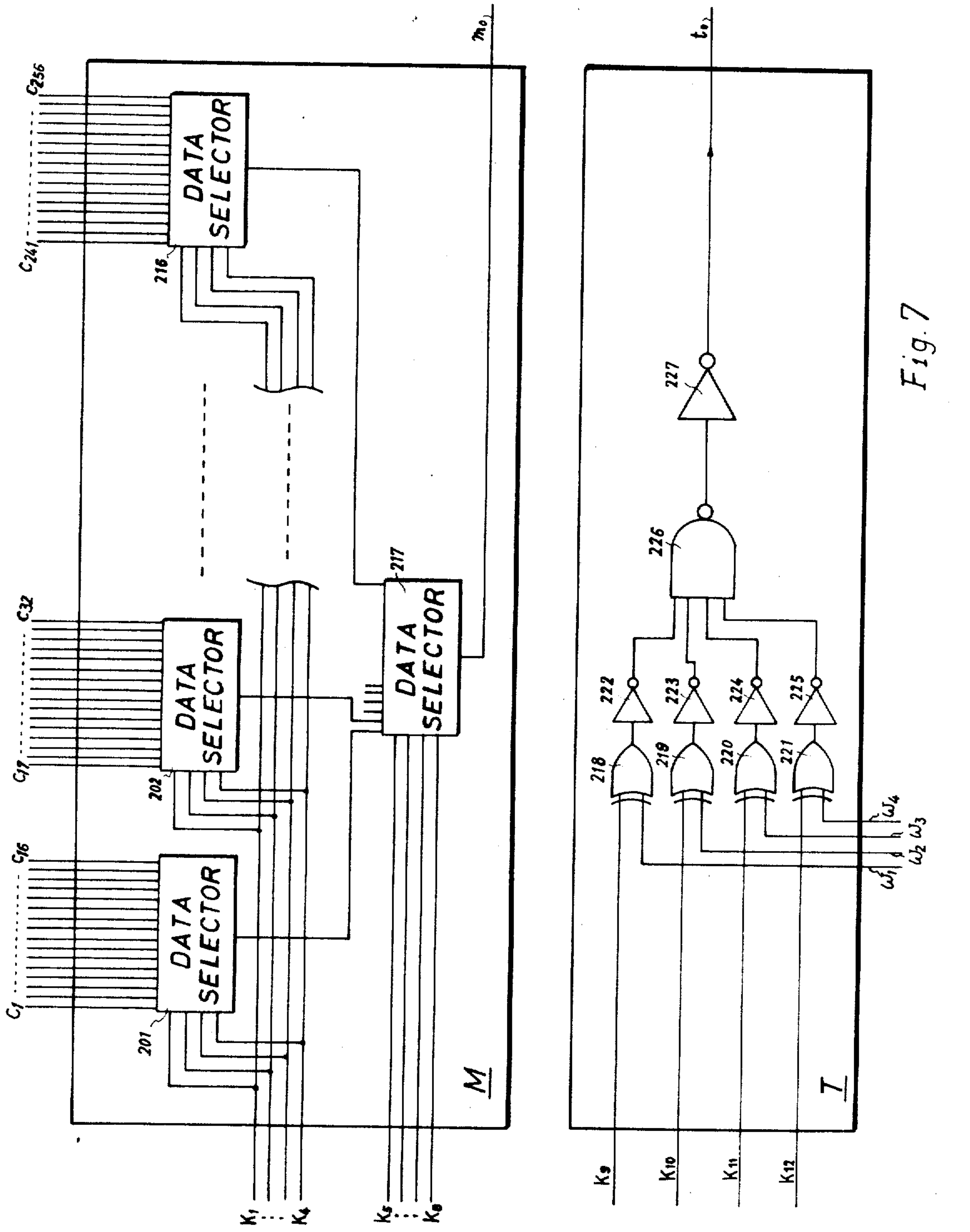
FIG. 7 is a block diagram illustrating an example of an selecting circuit B employed in the device of this invention.

With reference to FIGS. 4 and 7, an example of the memory selector M comprises a data selector 201 for selecting one of the main memories $C_1$ to $C_{16}$ in response to four output bits $k_1$ to $k_4$ of the register K, a data selector 202 for selecting one of the main memories $C_{17}$ to $C_{32}$ in response to four output bits $k_1$ to $k_4$ of the register K, . . . a data selector 216 for selecting one of the main memories $C_{241}$ to $C_{256}$ in response to four output bits $k_1$ to $k_4$ of the register K, and a data selector 217 for selecting one of respective outputs of the data selectors 201 to 216 in response to four output bits $k_5$ to $k_8$ of the register K. The output $m_o$ of the data selector 217 is applied to buffer memories $A_1$ and $A_{11}$.

Figure 8:
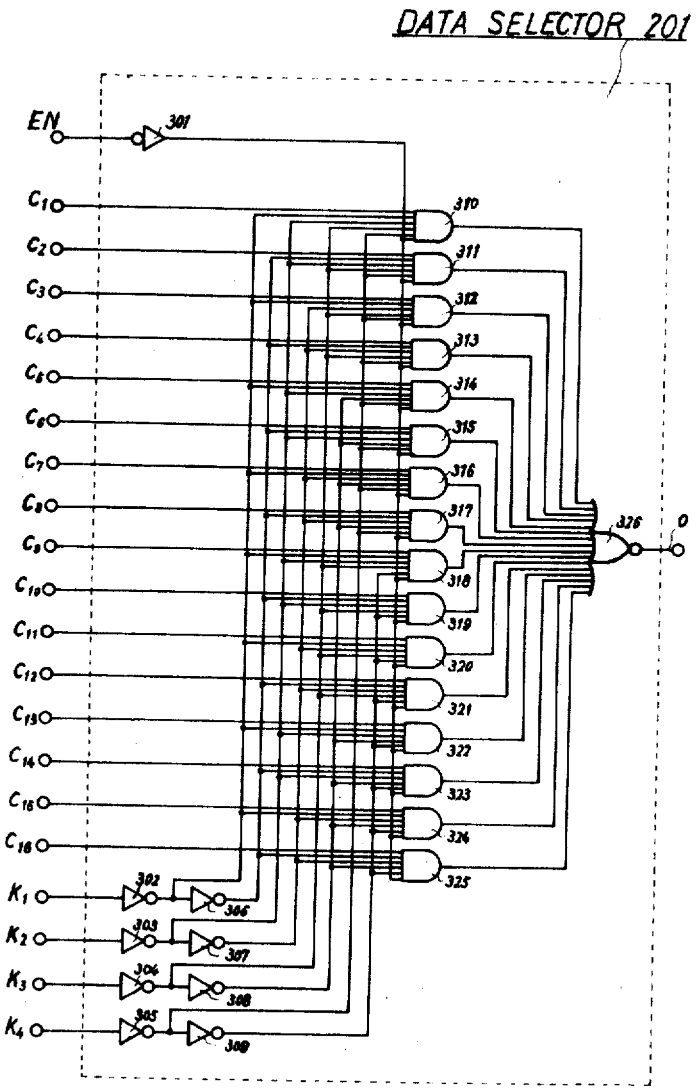
FIG. 8 is a block diagram illustrating an example of a data selector employed in the example shown in FIG. 7.

Each of the data selectors 201, 202, . . . 216, and 217 comprises, as shown in FIG. 8 for the example of the data selector 201, NOT circuits 301, 302, 303, 304, 305, 306, 307, 308 and 309, AND circuits 310 to 325, and an OR circuit 326. Accordingly, one of the main memories ($C_1$ to $C_{16}$) is selected by the data selector 201 in response to the four output bits $k_1$ to $k_4$ of the register K in synchronism with an enable pulse EN.

With reference to FIGS. 4 and 7, and example of the zone selector T comprises Exclusive OR circuits 218 to 221, NOT circuits 222 to 225, a NAND circuit 226 and a NOT circuit 227. Four output bits $k_9$, $k_{10}$, $k_{11}$ and $k_{12}$ are respectively applied to the Exclusive OR circuits 218 to 221, while outputs $w_1$, $w_2$, $w_3$ and $w_4$ of the decimal counter 102 shown in FIG. 6 are respectively applied to the Exclusive OR circuits 218 to 221. When the states of the four bits $k_9$ to $k_{12}$ coincide with the states of respective inputs of the Exclusive OR circuits 218 to 221, an output $t_o$ assumes a state "1".

Figure 9:
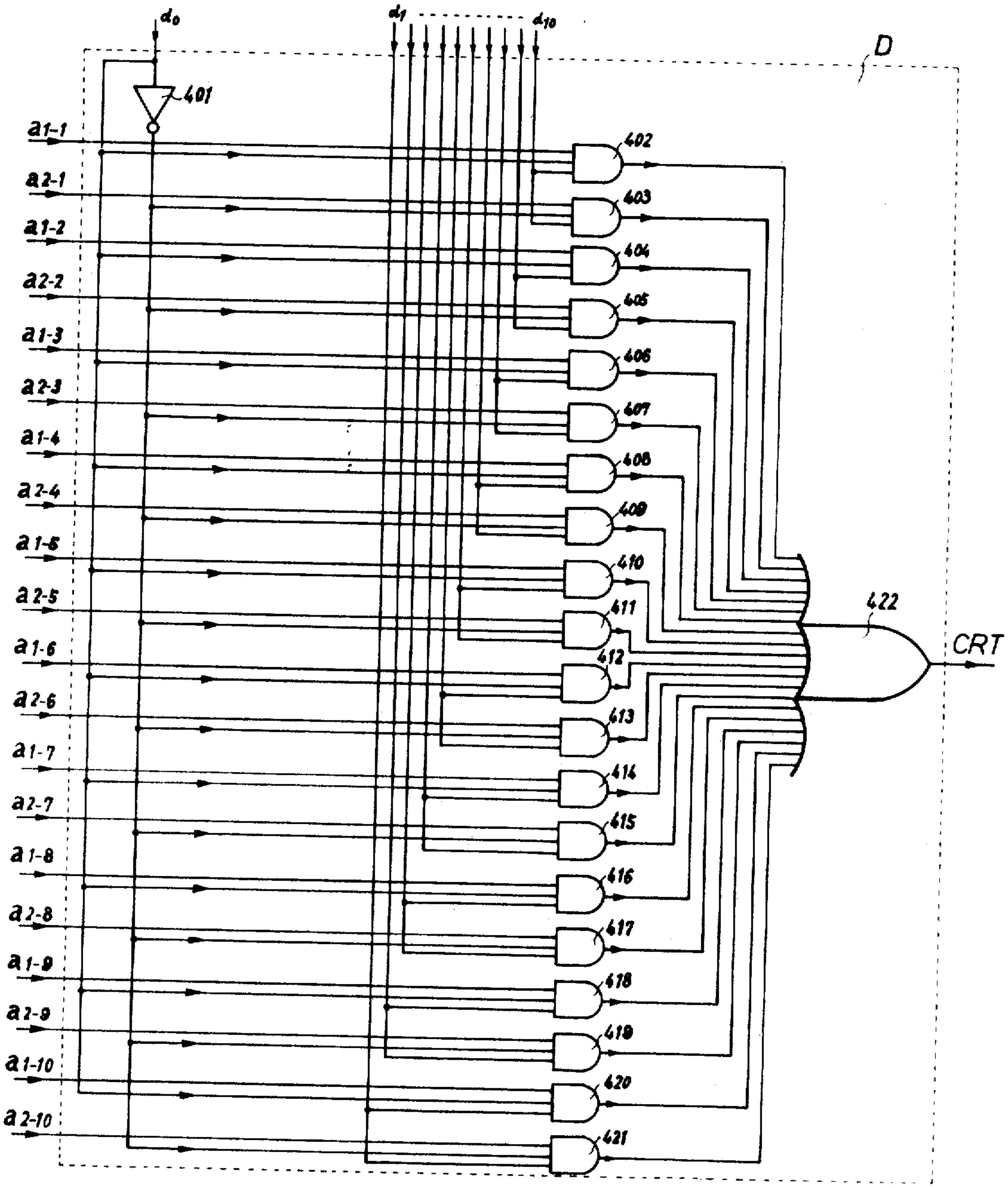
FIG. 9 is a block diagram illustrating an example of a switching circuit employed in the device of this invention.

With reference to FIG. 9, an example of the switching circuit D comprises a NOT circuit 401 receiving the control output $d_o$ from the flip-flop circuit 101 shown in FIG. 6, AND circuits 402 to 421, and an OR circuit 422. For example, outputs $a_{1\text{-}1}$ and $a_{2\text{-}1}$ of the selecting unit $SU_1$ are respectively applied to the AND circuits 402 and 403 together with the true output $d_{10}$ of the four line-to-ten line decoder 104. Moreover, the input and output of the NOT circuit 401 are respectively applied to the AND circuits 402 and 403. All the outputs of the AND circuits 402 to 421 are applied to the cathode-ray tube CRT through the OR circuit 422.

With reference to FIGS. 3, 4 and 6 to 11, the operations of the memory device of this invention are further described below.

In the first grand cycle of the main memories $C_1$ to $C_{256}$, the address codes F of the memory 100 are set into the respective registers J of the selecting units $SU_1$ to $SU_{10}$ shown in FIGS. 3 and 4 in response to control pulses $FS_1$ to $FS_{10}$ from the AND circuits 105 to 114 shown in FIG. 6. The address code F set in the register J is transferred to the register K in response to a pulse $s$ timed with the end of the first grand cycle.

In the second grand cycle of the main memories $C_1$ to $C_{256}$, contents of the main memories ($C_1$ to $C_{256}$) designated by the address codes set in the registers K are transferred to buffer memories $A_{11}$ to $A_{20}$, while the address codes F of the memory 100 are set into the respective registers J and then in the registers K.

In the third grand cycle of the main memories $C_1$ to $C_{256}$, contents $a_{1\text{-}1}$ to $a_{2\text{-}10}$ of the buffer memories $A_{11}$ to $A_{20}$ of the selecting units $SU_1$ to $SU_{10}$ are successively selected by the AND circuits 402 to 421 of the switching circuit D and successively applied to the cahtode-ray tube CRT through the OR gate 422. Moreover, contents of the main memories ($C_1$ to $C_{256}$) are transferred to the buffer memories $A_1$ to $A_{10}$ in accordance with address codes, which had been set in the address registers K at the end of the second grand cycle. Distribution of the address codes F from the memory 100 and setting the same to the registers J and K are also carried out in the manner similar to the first and second grand cycles.

In the fourth grand cycle, operations for the buffer memeories $A_1$ to $A_{10}$ are replaced by operations for the buffer memories $A_{11}$ to $A_{20}$ in the third grand cycle.

Thereafter, the operations in the third grand cycle and the fourth grand cycle are repeatedly performed.

Contents of the main memories ($C_1$ to $C_{256}$) corresponding to address codes, which are read out from the memory 100 at the begining of the first grand cycle, are applied to the cathode-ray tube CRT at the begining of the third grand cycle.

What I claim is:

1. A random-access memory device, comprising: a plurality of circulating main memories having a plurality of memory zones allocated sequentially; a plurality of circulating buffer memories arranged in parallel with respect to said main memories and each buffer memory having a memory capacity equal to $1/h$ of the memory capacity of each circulating main memory and each buffer memory circulating in the same clock timing as each circulating main memory, wherein "$h$" is an integer greater than two and the number of said buffer memories being equal to twice the number of all memory zones of each of said main memories, and said buffer memories being equally divided into two groups; means for generating zone selecting coded signals; means coupled to each circulating main memory, said circulating buffer memories, and the zone selecting coded signal generating means for successively reading out blocks of binary information stored in each main memory to selected ones of the buffer memories including means for alternately selecting one and the other of said two groups; means for selecting a desired one of said circulating main memories and corresponding ones of the memory zones therein in response to said zone selecting coded signals and selection means coupled to said circulating buffer memories for selecting the buffer memories to effect the reading out of the data stored therein in a desired order after the reading out from the circulating main memories.

2. A random-access memory device, comprising: at least one circulating main memory having a plurality of sequential memory zones; a plurality of circulating buffer memories all arranged in parallel with respect to said main memory and each having a memory capacity equal to $1/h$ of the memory capacity of the circulating main memory and each circulating in response to the same clock timing as the circulating main memory to effect the serial storing of information from one of the memory zones of the main memory, where "$h$" is an integer greater than two, the number of said buffer memories being equal to twice the number of all memory zones of said main memory, and said buffer memories being equally divided into two groups; means for generating zone selecting coded signals; group selection means operatively coupled to said circulating buffer memories for alternately selecting one or the other of said two groups; reading-out means operatively coupled to said circulating main memory, said circulating buffer memories, and the coded signal generating means for successively reading out blocks of binary information stored in the main memory to said selected ones of said groups of buffer memories including means for connecting corresponding ones of the memory zones to said selected ones of said groups of buffer memories in response to said zone selecting coded signals; output terminal means; and switching means operatively coupled to the output of said circulating buffer memories and said output terminal means for selectively switching the output of each of said buffer memories to said output terminal means in a desired order after completion of the read-out from said circulating main memory.

3. A random-access memory device according to claim 2, in which a plurality of said circulating main memories are provided and said reading-out means includes means for selecting a desired one of the circulating main memories.

* * * * *